Sept. 6, 1955           J. L. KOPF           2,716,936
APPARATUS FOR ROASTING COFFEE
Filed Jan. 17, 1951           2 Sheets-Sheet 1
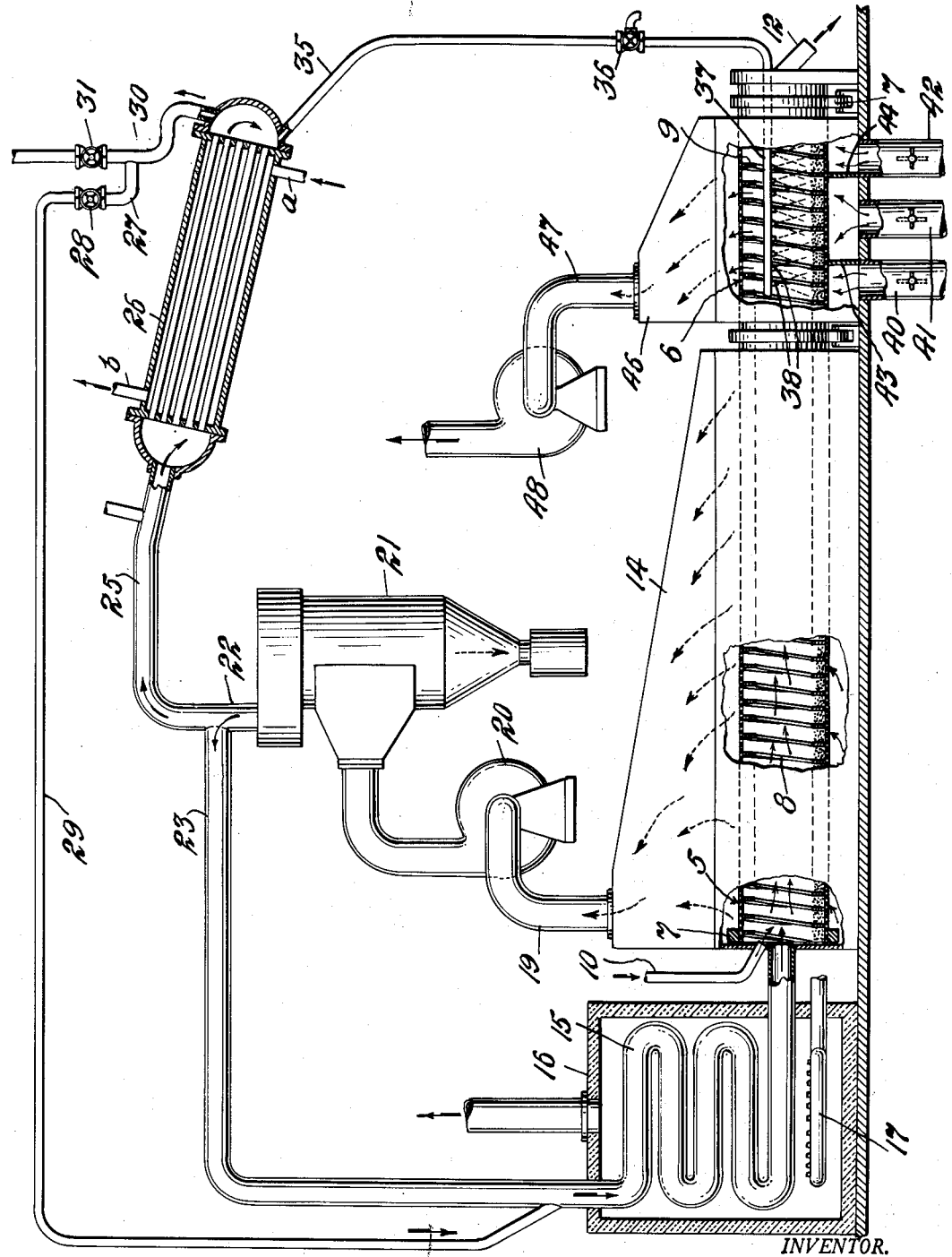
INVENTOR.
JOSEPH L. KOPF
BY
Lawrence K. Sager
ATTORNEY

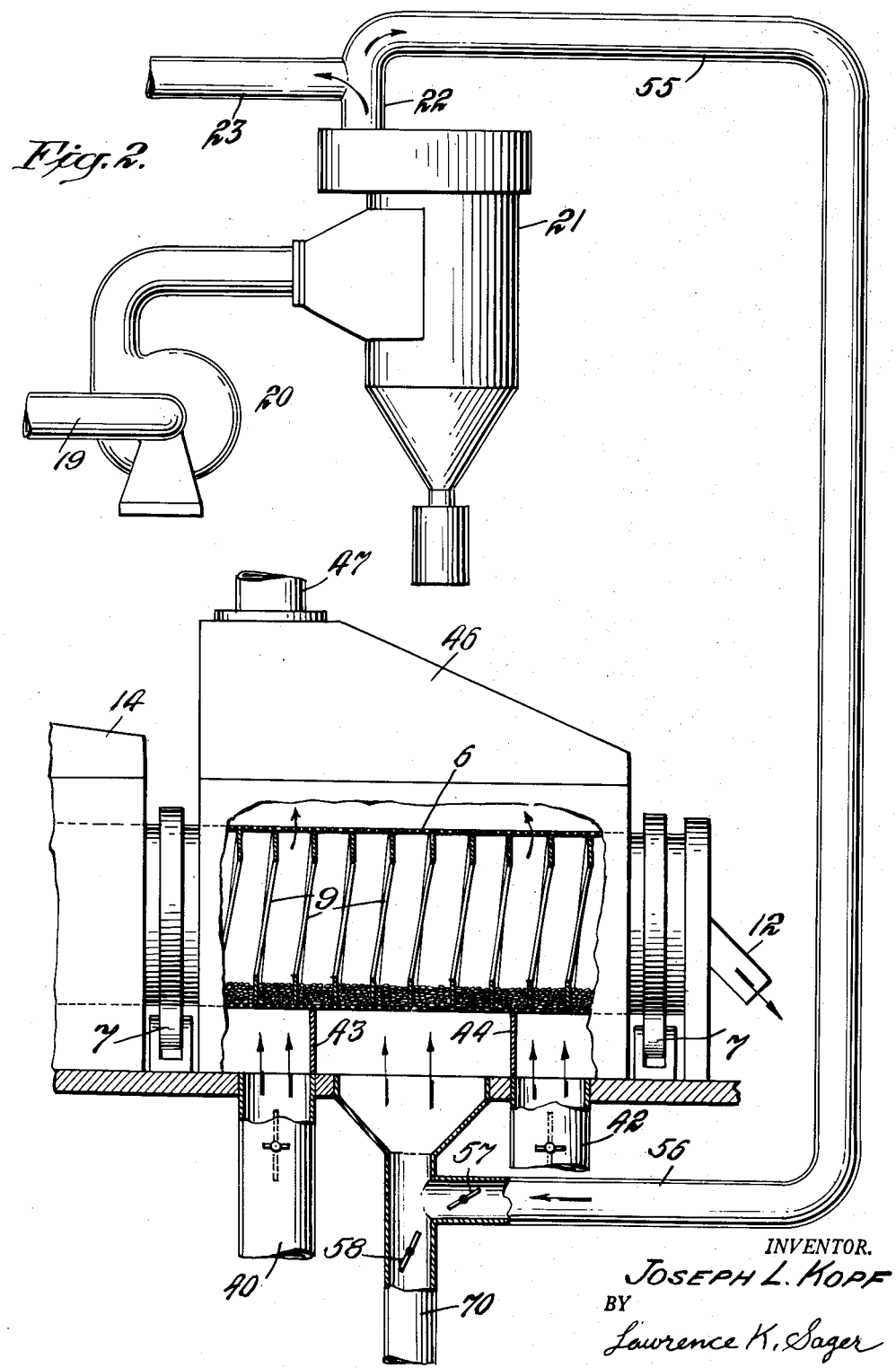

United States Patent Office 2,716,936
Patented Sept. 6, 1955

2,716,936

APPARATUS FOR ROASTING COFFEE

Joseph L. Kopf, Maplewood, N. J., assignor to Jabez Burns & Sons, Inc., New York, N. Y., a corporation of New York Application January 17, 1951, Serial No. 206,400

3 Claims. (Cl. 99—236)

This invention relates to the roasting of coffee and particularly to roasting systems wherein volatiles from the roasting cylinder are withdrawn, treated and returned to the coffee.

The object of the invention is to provide a roasting system for the coffee which will be continuous in operation and widely variable to give desired control of the volatiles and their withdrawal and treatment and the manner and conditions under which they are returned to the coffee during roasting and/or cooling.

Further objects of the invention, particularly in the provision of apparatus for the circulation, control and return of the volatiles and the resultant conditioning of the coffee, will appear from the following specification taken in connection with the accompanying drawings in which Fig. 1 is a diagrammatic elevational view of a system embodying the invention and with parts broken away to show the inner structural forms; and Fig. 2 is a partial similar diagrammatic view of a modified system returning volatiles in uncondensed form to the coffee in the cooling cylinder.

In the system diagrammed in Fig. 1 the perforate roaster cylinder 5 has a cooling cylinder 6 at its discharge end and is mounted in supporting bearings 7 for rotation in usual manner. A continuous helical flange 8 within the cylinder 5 conveys the coffee from the entrance end where the coffee is received through the supply 10 to its exit end where it passes into the cooling cylinder 6 also provided with a continuous feed flange 9 to the discharge end where the roasted and cooled coffee passes out through the outlet 12.

A casing 14 encloses the roaster cylinder 5 and the hot air stream, gases, vapors, etc. from the coffee are collected in this casing and withdrawn through duct 19 by the exhaust fan 20 and pass to the separator 21 from which the cleaned air and volatiles are passed through duct 22 to return duct 23 and condenser duct 25. A portion of the air stream, gases and vapors is thus returned to the heating coil 15 and indirect heater 16 provided with the gas burner 17. The heating coil 15 is connected to discharge directly into the roaster cylinder 5 as shown so that there is a closed circuit of the air, gases, vapors and the like through the roaster cylinder, separator and heater, the volatiles being cleaned of foreign material such as chaff, etc. in the separator during the circulation.

The cleaned air and volatiles passing through duct 25 are received in the condenser 26 where they are cooled by a water supply entering at *a* and discharging at *b* and the condensed liquids are collected at the lower end and drawn off by the condensate pipe 35. The non-condensable gases are discharged through pipes 27 and 30 controlled respectively by the valves 28 and 31. Pipe 27 connects with the gas return pipe 29 reintroducing these non-condensable gases into the return duct 23 leading to the heating coil 15. The pipe 30 is a relief discharging to atmosphere and its valve 31 in conjunction with the control valve 28 determines the proportion of the air and non-condensable gases and vapors which are bled from the system. The desired proportion of the non-condensable gases are thus returned to the heated supply of air and gases entering the roasting cylinder and this circuit is continuously in operation with the circuit through the roaster cylinder and the separator. The coffee is heated in this atmosphere of the recirculated air, gases and vapors and at the same time is continuously passing through the roaster cylinder, the bleed-off through the pipe 30 and valve 31 taking care of the accumulation of the vapors, gases, smoke, etc. emitted during the roasting. The cleansing of the recirculated stream is continuous in the separator and the entire recirculated stream is brought to desired temperature in the indirect heater 16.

The cooling cylinder 6 is provided with an enclosing casing 46 exhausted through duct 47 by cooler fan 48. In the specific form shown in Fig. 1, air to the cooling cylinder 6 is supplied through ducts 40, 41, and 42 each provided with a control valve gate or damper to regulate these air supplies to the entrance, middle section and discharge of the cooler, these supplies being separated in the cooling compartment by the barriers or partitions 43 and 44 as shown to give any desired distribution and concentration of the cooling. The discharge pipe 35 for the condensate from the condenser 26 has a valve 36 for a bleed-off discharge to regulate the return of the condensate to the spray pipe 37 extending through the cooling cylinder 6 from the discharge end as shown and provided with a series of spray nozzles 38 distributing the condensate over the coffee as it is being cooled in cylinder 6. These nozzles 38 may be individually set to give a desired limitation or concentration of the condensate spray to any portion of the coffee in the cooling cylinder 6, thus returning to the coffee the aromas, fats and waxes and other ingredients removed during the roasting process. These valuable constituents improve the flavor of the coffee, keeping qualities, aroma, etc. and at the same time reduce the loss in weight that occurs when such gases are simply allowed to escape to the atmosphere. These gains in quality and weight can be controlled and applied by the user by regulation of the cooling action and by selecting the point during the cooling at which the condensate is returned to the coffee.

In this system, volatiles from the roasting are, therefore, divided and returned to the coffee as it passes continuously through the roasting and cooling operations. The non-condensables return to the entrance end of the roasting cylinder and the condensate is returned to the coffee in the most effective part of the cooling action to contribute to the final flavor and quality of the product. During this cooling of the coffee to approximately the temperature of the atmosphere the condensate is applied at any desired temperature between that of roasted coffee (for instance, 410°) and cooled coffee (80–110°).

The diagram of Fig. 2 illustrates a similar system of division of the volatiles but without the condenser. In this modified system the cleansed air, gases and vapors passing from the separator 21 to duct 22 are divided between the ducts 23 and 55, 23 leading back through the heater to the entrance to the roasting cylinder as illustrated in Fig. 1 and duct 55 leads the gases back to the cooling stage of the treatment through duct 56 passing these gases into the air supply to the cooling cylinder 6. In the figure shown the duct 56 is led into the central air supply 70 between the supplies 40 and 42 to the entrance and supply sections. Valves 57 and 58 by their relative setting will control the apportioning of the fresh air and return gases to the center supply. Duct 56 may be similarly connected with separate valves to the entrance and discharge air supplies 40 and 42.

The omission of the condenser leaves no separate condensate and the spray pipe 37 of the Fig. 1 system is omitted. The condensable gases and vapors are carried in the return stream through duct 56 and pass with the air stream to the cooling coffee at the desired range of temperature of the coffee.

The system of this invention is highly adaptable in its control of the roasting and cooling treatments and at the same time provides for continuous operation. Six thousand pounds of coffee may be roasted per hour. The time in the roaster cylinder 5 is about five minutes and the loading of this cylinder is nearly five hundred pounds with continuous evolutions of water vapors, gases, smoke, etc. at the rate of about seventy-five pounds in each five minutes. The gases passing to the condenser are partially liquefied (Fig. 1) and this condensate is distributed on the cooling coffee during its travel in the cooling cylinder 6. Similarly in the modification of Fig. 2 the cooling coffee is bathed in an atmosphere of recirculated volatiles.

These treatments together with the continuity of the system as a whole and in each part yield a high output with maintenance of high quality under the accurately predetermined controls of both the roasting and cooling operations.

I claim:

1. In a coffee roasting system means for continuously conveying a stream of coffee through a roasting chamber and a cooling chamber in sequence comprising coaxial perforate drums so that a continuous stream of coffee is roasted, cooled and delivered from the cooling chamber, means introducing heated gases into the interior of the roasting chamber at the entrance end thereof, means collecting the gases passing outward through the perforate drum constituting the roasting chamber, means receiving gases from said collecting means and recirculating them through a heater and said gas introducing means leading to the entrance end of said roasting chamber to roast the coffee therein, and means for continuously cooling and discharging coffee from said cooling chamber.

2. A coffee roasting system as set forth in claim 1 in which there are means receiving gases from the said collecting means and continuously condensing and returning them to the coffee in the cooling chamber by distribution along the stream of cooling coffee during its travel therethrough.

3. A coffee roasting system as set forth in claim 1 in which there are means receiving gases from said collecting means and continuously cooling said gases and returning them to the stream of coffee during its travel through the cooling chamber.

References Cited in the file of this patent

UNITED STATES PATENTS

| | | |
|---|---|---|
| 83,889 | Taylor | Nov. 10, 1868 |
| 493,606 | Trillich | Mar. 14, 1893 |
| 764,226 | Cottrell | July 5, 1904 |
| 1,340,692 | Wilcox et al. | May 18, 1920 |
| 1,981,234 | Hetzer | Nov. 20, 1934 |
| 1,991,190 | Backer et al | Feb. 12, 1935 |
| 1,991,564 | McLain et al | Feb. 19, 1935 |
| 2,087,602 | McCrosson | July 20, 1937 |
| 2,581,148 | Scull et al. | Jan. 1, 1952 |
| 2,593,983 | Chalupa | Apr. 22, 1952 |
| 2,614,043 | Lenz | Oct. 14, 1952 |

FOREIGN PATENTS

| | | |
|---|---|---|
| 501,199 | Great Britain | Feb. 21, 1939 |
| 645,601 | Germany | May 31, 1937 |